United States Patent [19]
Tung et al.

[11] Patent Number: 4,511,210
[45] Date of Patent: Apr. 16, 1985

[54] RETROREFLECTIVE SHEETING

[75] Inventors: Chi F. Tung, Mahtomedi; James C. Coderre, White Bear Lake, both of Minn.

[73] Assignee: Minnesota Mining and Manufacturing Company, St. Paul, Minn.

[21] Appl. No.: 532,695

[22] Filed: Sep. 16, 1983

Related U.S. Application Data

[60] Continuation of Ser. No. 447,615, Dec. 7, 1982, abandoned, which is a division of Ser. No. 275,275, Jun. 19, 1981, Pat. No. 4,367,920, which is a continuation-in-part of Ser. No. 80,434, Oct. 1, 1979, abandoned.

[51] Int. Cl.³ .............................................. G02B 5/128
[52] U.S. Cl. .................................... 350/105; 427/163
[58] Field of Search ................................. 350/97–105; 427/163

[56] References Cited

U.S. PATENT DOCUMENTS

| | | | |
|---|---|---|---|
| 2,963,378 | 12/1960 | Palmquist et al. | 106/193 |
| 3,025,764 | 3/1962 | McKenzie | 350/105 |
| 3,190,178 | 6/1965 | McKenzie | 350/105 |
| 3,496,006 | 2/1970 | Rideout et al. | 350/105 |
| 3,573,954 | 4/1971 | Yamamoto | 350/105 |
| 3,795,435 | 3/1974 | Schwab | 350/105 |
| 4,023,889 | 5/1977 | Eagon et al. | 350/105 |
| 4,099,838 | 7/1978 | Cook et al. | 350/105 |
| 4,102,562 | 7/1978 | Harper et al. | 350/105 |
| 4,104,102 | 8/1978 | Eagon et al. | 156/298 |
| 4,226,658 | 10/1980 | Carlson et al. | 156/247 |

FOREIGN PATENT DOCUMENTS 28837 9/1973 Japan .

Primary Examiner—Bruce Y. Arnold
Assistant Examiner—William Propp
Attorney, Agent, or Firm—D. M. Sell; J. A. Smith; R. R. Tamte

[57] ABSTRACT

New methods for making "embedded-lens" retroreflective sheeting, and new forms of such sheeting, are provided. The new methods involve embedding microspheres into a web by continuously presenting a mass of the microspheres against the moving web and heating the web so as to soften at least an exterior stratum of the web, and adding a spacing layer to the microsphere-covered surface of the web. The microspheres are embedded on the average to less than 50 percent of their diameter, which has been found to cause the spacing layer to conform around a greater proportion of the back surface of individual microspheres and thereby position a greater portion of the specularly reflective layer carried on the spacing layer at the approximate focal point for light passed through the microspheres. Use of a preformed spacing layer also contributes to maintaining the spacing layer at a constant thickness around the back surface of the microspheres.

7 Claims, 7 Drawing Figures

RETROREFLECTIVE SHEETING

REFERENCE TO RELATED APPLICATION

This is a continuation of application Ser. No. 447,615, filed Dec. 7, 1982 (now abandoned) which was a division of application Ser. No. 275,275, filed June 19, 1981 which was a continuation-in-part of application Ser. No. 80,434, filed Oct. 1, 1979 and now abandoned. Application Ser. No. 275,275 has now issued as U.S. Pat. No. 4,367,920.

BACKGROUND OF THE INVENTION

A typical prior art "embedded-lens" retroreflective sheeting, as illustrated in FIG. 1 of the attached drawing, comprises a monolayer of microspheres 11 embedded between transparent bonding and spacing layers 12 and 13; a specularly reflective layer 14, typically aluminum vapor-deposited on the spacing layer 13; a layer of adhesive 15 covering the reflective layer; and a transparent top layer 16, which forms the exterior front surface of the sheeting. Light rays incident on the sheeting travel through the layers 16 and 12 to the microspheres 11, which act as lenses focusing the incident light approximately onto the appropriately spaced specularly reflective layer 14. Thereupon the light rays are reflected back out of the sheeting along substantially the same path as they traveled to the sheeting.

Embedded-lens sheeting as described has the advantage that, because the microspheres are embedded within the sheeting, incident light rays are focused onto the specularly reflective layer irrespective of whether the front of the sheeting is wet or dry. Such sheeting was first taught in Palmquist et al, U.S. Pat. No. 2,407,680, and has been sold commercially for many years in large volume and to the general satisfaction of its users. Despite that general utility, however, there has been a desire for improvement in certain properties of the sheeting, one of which is in the angles at which the sheeting will retroreflect brightly. Retroreflection is generally at a maximum for light that is approximately perpendicular to the sheeting (i.e., has an incidence angle of 0°) and declines as the incident light slants away from the perpendicular (i.e., increases in incidence angle). Such a decline in retroreflectivity can be a disadvantage, for example, by limiting the length of time that a retroreflective traffic-control sign is seen at night as a vehicle passes by, or the length of time a retroreflective license plate will be seen as two vehicles meet on the highway.

SUMMARY OF THE INVENTION

We have now found a new method for manufacturing embedded-lens retroreflective sheeting, as well as a new form of such sheeting, that provides a wider angular range of retroreflectivity, as well as other important improvements in properties. Briefly, this new method comprises the steps of:

(1) continuously presenting a mass of microspheres against a moving carrier web such as polyethylene-coated paper and heating the web so as to soften at least an exterior stratum of the web and partially embed a dense monolayer of microspheres in the web;

(2) covering the monolayer of microspheres with a layer of transparent binder material having an exterior surface cupped around the microspheres;

(3) applying a specularly reflective layer to the cupped surface of the layer of transparent binder material;

(4) in typical embodiments, applying an adhesive layer over the specularly reflective layer;

(5) optionally removing the carrier web from the assembly formed by the layer of transparent binder material and microspheres; and (6) if the carrier web is removed, applying transparent polymer-based material over the microsphere-covered surface left upon removal of the carrier web, e.g., by coating, laminating, dipping or spraying, to form a transparent top layer in which the microspheres are embedded.

Sheeting prepared by this method has a number of distinctive features which are believed to account for significantly improved properties of the sheeting. These distinctive features can be illustrated by reference to FIG. 2 of the attached drawing, which is an enlarged sectional view through a representative sheet material of the invention 20.

(1) The front surfaces or edges of the microspheres 21 in sheeting of the invention tend to be more nearly aligned in a common plane than the front surfaces of the microspheres 11 of the prior-art sheeting 10 shown in FIG. 1. Instead of front-surface alignment, the microspheres 11 in the prior-art sheeting 10 tend to be aligned at their equator, since they were floated at their equator in the solution that forms the bonding layer 12 (surface-active agents are commonly applied as described in Weber, U.S. Pat. No. 3,222,204, to assist the microspheres to float at their approximate equator).

The improved front-surface alignment of microspheres in sheeting of the invention is theorized to occur during embedding of the microspheres in the carrier web, as a result of the general planarity of the exterior surface of the carrier web, and the embedding of the microspheres into that surface to a generally uniform depth. The microsphere surfaces embedded in the carrier web become the front surfaces in finished sheeting of the invention.

The improved front-surface alignment of the microspheres contributes to an increased angular range of retroreflectivity, since a higher proportion of microspheres participates in the retroreflection at wide angles of incidence. As will be subsequently discussed, other features of sheeting of the invention are also believed to contribute to the improved angularity, which is a significant increase. Whereas the retroreflection of prior-art embedded-lens sheetings generally declines to about three-quarters of its maximum value when the incidence angle increases to less than 35° (called the "three-quarter brightness angle"), sheetings of the present invention retain three-quarter brightness at angles of incidence beyond 35°, and in preferred embodiments exhibit three-quarter brightness angles that average about 40° or more.

(2) Specularly reflective material 24 can overlie a larger proportion of the circumference of an individual microsphere 21 in sheeting of the invention than it does in prior-art sheeting. This increased overlying occurs because the microspheres are generally embedded into the carrier web to between 30 or 40 percent of their diameter, and in any event less than 50 percent of their diameter, to allow convenient removal from the carrier web; and the spacing layer and specularly reflective layer applied over the unembedded portions of the microspheres can penetrate more deeply between adjacent microspheres than they do in conventionally prepared embedded-lens retroreflective sheeting. This greater penetration means that the specularly reflective layer extends into a position to reflect light rays that impinge on the sheeting at higher incidence angles and thereby further contributes to the increased angular range of sheeting of the invention.

(3) Microspheres are present in sheeting of the invention at a greater density per unit of area than in the prior-art sheeting. The most common commercial varieties of retroreflective sheeting include sufficient microspheres (typically ranging between about 50 and 100 micrometers in diameter and averaging about 75 micrometers in diameter) to cover about 60–65 percent of the area of the sheeting; the best prior-art product we have ever seen covers about 72 percent of the area. In most sheeting of the invention microspheres cover at least 75 percent of the area of the sheeting and preferably cover at least 80 percent of the area. The increased concentration of microspheres appears to arise from the step of presenting a mass of microspheres under pressure against a thermosoftening carrier web such as polyethylene-coated paper and heating the web to embed the microspheres in the web.

The greater concentration of microspheres in sheeting of the invention means that a higher percentage of incident light is focused onto the specularly reflective layer and is thereby reflected back toward the original source of the light. Whereas the most common commercial varieties of sheeting as described have exhibited typical retroreflective brightness on the order of 70 candella per square meter of sheeting per lux of incident light (or 70 candle power per square foot per lumen), sheetings of the invention are routinely capable of 100 or more, and preferably achieve 150 or more candella per square meter per lux of incident light; these measurements are made under the standard conditions of illuminating the sheeting at an incidence angle of $-4°$ and measuring retroreflectivity at a divergence angle of $0.2°$.

(4) Microspheres in sheeting of the invention are generally free of any chemical treatment for causing the microspheres to float in a layer of binder material. Such treatments generally operate by limiting the ability of an organic liquid to wet or contact the microspheres, and it is believed that such a limitation may prevent full contact between the microspheres and a binder material subsequently applied to them. Such a lack of full contact would presumably interfere with optimum light transmission. It is theorized that the absence of such a chemical treatment provides improved optical contact between the binder material and microspheres in sheeting of the present invention.

(5) Sheeting of the invention has good cupping of the spacing layer behind the microspheres, thereby positioning a higher proportion of the specularly reflective layer at the curved plane where light rays that pass through an individual microsphere are focused. This improved cupping is believed due to the greater penetration of the spacing layer between adjacent microspheres discussed above, and also to the use of polymeric materials or solutions of appropriate viscosity or flow characteristics. The improved cupping is indicated by measurements of microroughness on the back of the spacing layer or on the back of the specularly reflective layer coated on the spacing layer. Generally, in preferred sheeting of the invention this cupping is sufficient for microroughness readings of 125 microinches, arithmetic average, or more (about 3 micrometers or more) when measured on a Bendix portable Profilometer using a 2.5-micrometer-radius diamond stylus. The desired microroughness varies somewhat with the size of the microspheres and can be 5 or 10 percent higher for larger microspheres used in some reflective sheeting.

Prior-Art Statement

The first step in preparing reflective sheeting of the present invention, i.e., preparing a monolayer of microspheres partially embedded in a carrier web or support sheet, is the same as the first step in preparing reflective sheeting taught in McKenzie, U.S. Pat. No. 3,190,178. However, the rest of the method taught in the patent, and the reflective sheeting prepared by the method, known as encapsulated sheeting, are fundamentally different from the method and embedded-lens sheeting of the invention; and the patent does not predict the significant improvement in wide-angle reflectivity achieved by sheeting of the invention.

The next steps in making encapsulated sheeting after the noted common first step are to coat specularly reflecting material (rather than binder material as in the case of our new embedded-lens sheeting) onto the microspheres while they are held in the carrier web, and then apply binder material over the specularly reflective layer. After drying of the binder material, the carrier web is stripped away, and a pre-formed solid transparent cover film is laid against the exposed surfaces of the microspheres. Heat and pressure are applied to the assembly along a network of interconnecting lines, softening and deforming the layer of binder material in the pressed areas into contact with the cover film. Upon cooling of the binder material, the cover film becomes adhered to the assembly along the network of interconnecting lines, forming a plurality of hermetically sealed cells within which the microspheres are encapsulated and have an air interface.

The noted air interface of encapsulated sheeting achieves good wide-angle reflectivity, because the microspheres partially protrude above the binder material in which they are embedded; but that condition does not exist in embedded-lens sheeting of the invention, in which the microspheres are fully embedded in transparent polymeric material. Encapsulated sheeting as described in the McKenzie patent has no advantage in angularity of reflection over other reflective sheetings in which microspheres have an air interface, and the McKenzie patent offers no reason to think that a method starting in the same way as the method for preparing encapsulated sheeting would provide increased angularity in embedded-lens sheeting.

Another difference between our invention and prior-art teachings about encapsulated sheeting is a difference in rationale or purpose for using a carrier web in which microspheres are temporarily embedded. Use of a carrier web that may be stripped away to leave partially protruding microspheres is a natural step in manufacture of encapsulated sheeting, since a microsphere-exposed surface is desired in the final product. By contrast, in sheeting of the present invention, the microspheres are intended to be finally embedded in a binder material. Rather than being simply a support against which a final microsphere-exposed surface of sheeting is prepared, as in the case of encapsulated sheeting, we use the carrier web as a tool to desirable structural features such as front-surface alignment, increased coverage of specularly reflective material over the back surface of the microspheres, and dense packing of microspheres.

Air-exposure of microspheres has also characterized other instances in which microspheres are temporarily embedded in a carrier web—see Palmquist et al, U.S. Pat. No. 2,963,378 (microspheres are hemispherically reflectorized while held in the carrier web and then removed to form a free-flowing mass of reflective elements); Palmquist et al, U.S. Pat. No. 3,382,908 (an exposed-lens elastomeric sheeting useful for application to sidewalls is prepared by reflectorizing the microspheres held in the carrier web, coating elastomeric binder material over the microspheres, and removing the carrier web); and Harper et al, U.S. Pat. No. 4,102,562 (transfer sheet material for forming reflectorizing images on a substrate is formed by reflectorizing microspheres while they are held in a carrier web and then printing over the microspheres in an imagewise pattern with a transfer layer; with the carrier web still present, the transfer layer is activated and adhered to a substrate, whereupon the carrier web is stripped away to leave exposed-lens reflectorized images on the substrate).

Other structural differences between sheeting of the present invention and the prior-art encapsulated sheeting include the use of a transparent spacing layer between the microspheres and specularly reflective layer in sheeting of the present invention, while in the prior-art encapsulated sheeting the binder material is generally pigmented and is thermoformable to form the network of bonds to a cover sheet; and microspheres of different indices of refraction are used in the two sheetings (approximately 1.9-index microspheres in the prior-art encapsulated sheeting and approximately 2.2-index microspheres in sheeting of the invention).

DESCRIPTION OF THE DRAWINGS

As previously indicated.

DETAILED DESCRIPTION

Figure 1:
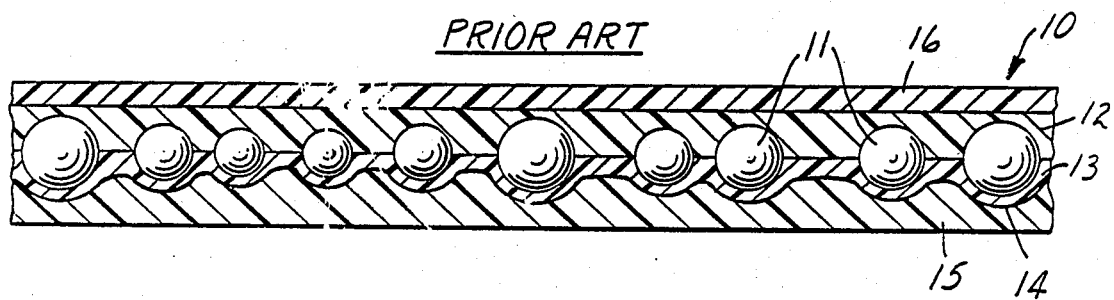
FIGS. 1 and 2 are enlarged sectional views through, respectively, a prior-art reflective sheeting and a reflective sheeting of the invention.

Additional description of the invention will first be provided by recitation of an exemplary preparation of sheeting of the invention, using FIGS. 2–6 for reference.

EXAMPLE 1

A carrier web 28 comprising a base sheet of paper 29 coated on one side with a 25-to-50-micrometer-thick layer 31 of low-density polyethylene is passed over heating rolls 37 and 38 heated respectively to 195° and 220° F. A bank 39 of microspheres 21 having a refractive index of 2.26 and a diameter ranging from 65 to 85 micrometers is maintained next to the last heating roll, and a dense monolayer of microspheres becomes adhered to the polyethylene layer on the carrier sheet. The softened polyethylene surface is rather slippery, which may contribute to a dense packing of the microspheres adhered to the web. Thereupon the web is passed through ovens heated to about 280° F., whereupon the polyethylene further softens, capillates up the microspheres, and draws the microspheres into the polyethylene until the microspheres are embedded to between 30 and 40 percent of their diameter. During the original adherence of the microspheres to the carrier web, the microspheres are believed to become embedded to approximately the same depth, and the subsequent capillation of the polyethylene appears to leave the microspheres embedded at an approximately common depth. From visual inspection of several small spots of the web, it was found that the microspheres covered about 75 percent of the area of the web.

Next 100 parts of a 25-percent-solids solution of aliphatic urethane resin in one-to-one mixture of isopropanol and toluol solvents (Permuthane U-6729 supplied by Beatrice Chemical) was mixed with 7 parts of ethylene glycol monomethylether and the mixture coated over the microsphere-covered surface of the carrier web with a bar-coater. The mixture had a coating viscosity of about 6000 centipoises. The coating was then dried for 4–5 minutes in forced-air ovens heated to 125° F.–250° F. to leave a transparent spacing layer 23. The coated material was found to have cupped around the back surfaces of the microspheres in the manner illustrated in FIG. 5 sufficiently for the back surface of the sheeting to have a microroughness of at least 160 microinches peak-to-peak as measured by a portable Bendix Profilometer having a 2.5-micrometer-diameter stylus with a maximum stylus pressure of 1.5 grams.

Figure 5:
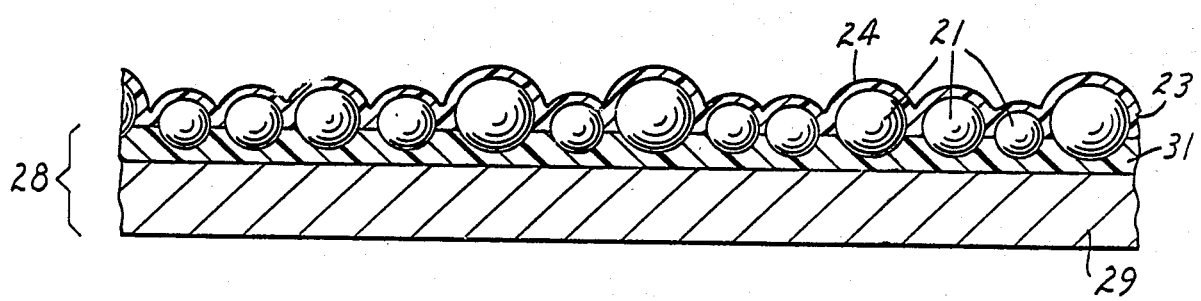

A layer 24 of aluminum was then vapor-coated onto the cupped surface of the spacing layer 23 by a known procedure to leave a sheet material as shown in FIG. 5.

Figure 6:
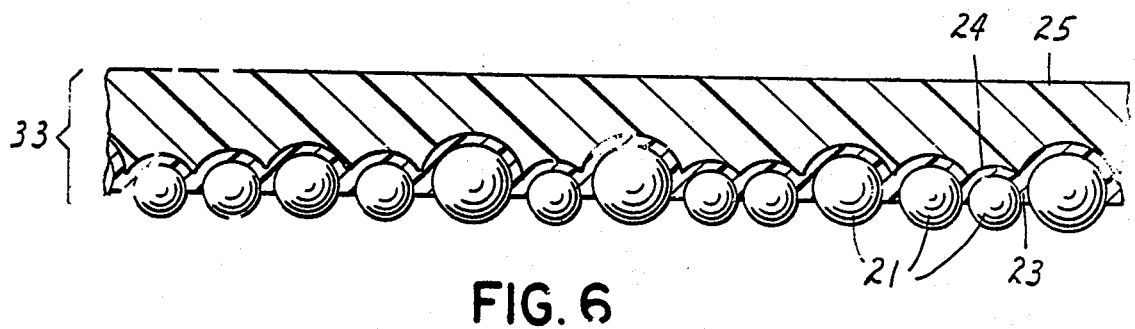

A layer 25 of pressure-sensitive acrylate adhesive was then coated from solution over the vapor-coated aluminum and dried, after which the carrier web 28 was stripped away, leaving a sheet material 33 as shown in FIG. 6 in which the microspheres 21 partially protruded from the front surface of the sheet material.

Figure 2:
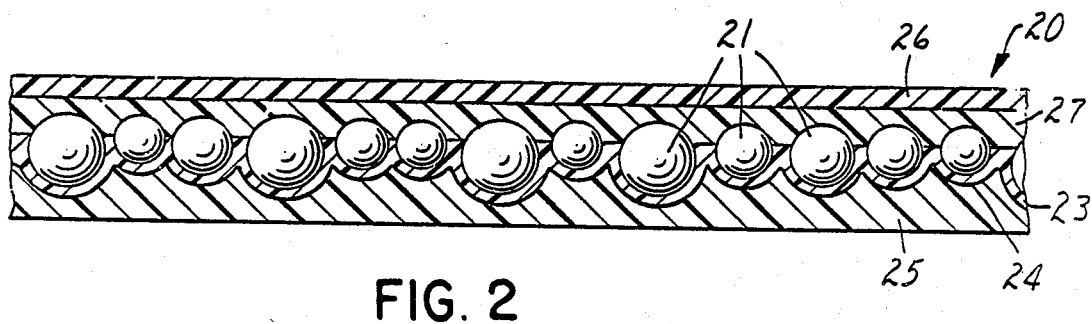
Figure 3:
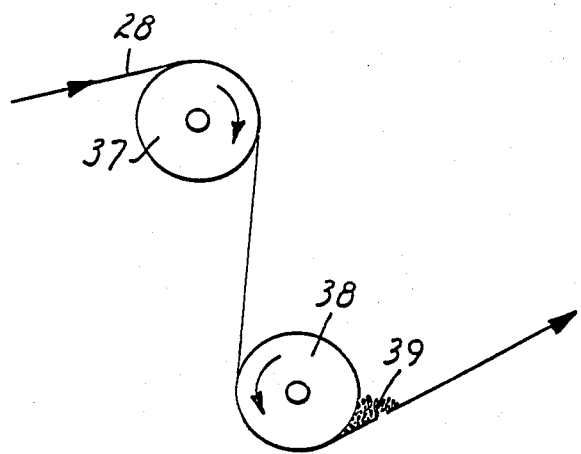
FIG. 3 is a schematic diagram of a portion of the apparatus used in manufacturing sheeting of the invention.

Thereafter an oriented polymethylmethacrylate film 26 coated with a layer of pressure-sensitive acrylate adhesive 27 was pressed against the microsphere-exposed surface, embedding the microspheres into the adhesive and forming a transparent front layer on the sheeting in the manner shown in FIG. 2. The coated film may be heated somewhat during laminaton (to temperatures less than the temperature of orientation of the film) to improve adhesion.

EXAMPLE 2

Figure 4:
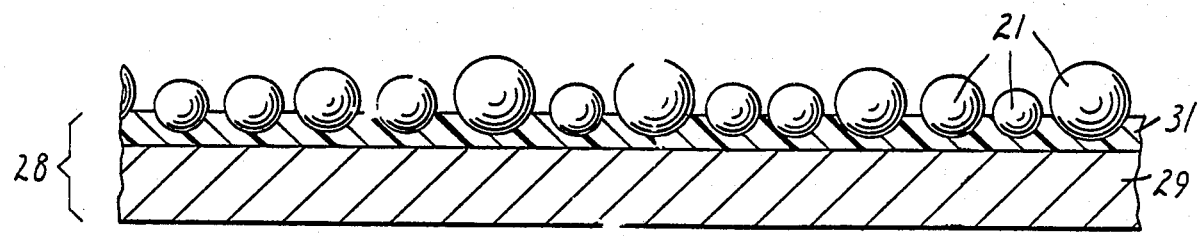
FIGS. 4–6 are enlarged sectional views through sheet structures prepared in the course of making a sheeting of the invention.

Example 1 was repeated except that a preformed film comprising a linear saturated polyester resin understood to be the reaction product of terephthalic acid, 1,2-cyclohexanedicarboxylic acid, ethylene glycol, diethylene glycol, and cyclohexanedimethanol (Bostick 7979 resin made by USM Corp. of Middleton, Mass.) was laminated to a web as shown in FIG. 4 to form the spacing layer 23. This lamination operation was performed by passing the assembly through heated nip rolls, one of which was a soft elastomeric roll. This operation provided a spacing layer of substantially uniform thickness over its whole extent, and was followed by the remaining steps described in Example 1.

EXAMPLE 3

Example 1 was repeated except that instead of adhering a top film 26 into the sheeting, a transparent layer of pressure-sensitive acrylate adhesive was coated over the partially exposed microspheres. In use, this sheeting can be adhered to a transparent panel such as an automobile window to form a retroreflective label viewable through the panel. If desired, a message is printed onto the microsphere surface prior to application of the adhesive. Removal of the label may disrupt the optical system, i.e., by loosening or removing microspheres, whereupon transfers of the sheeting are revealed due to nonuniform retroreflection.

EXAMPLE 4

Example 1 was repeated except that after the carrier web 28 was stripped away, the sheeting was adhered to a metal plate and the plate embossed to form a license plate. The plate was then dipped into a standard license plate coating solution, and the coating dried and cured, thereby completing the optical system and making the plate reflective whether wet or dry.

A wide variety of kinds of materials may be used in preparing sheet materials of the invention. The spacing layer 23 or top layer 26 may be an acrylic resin, alkyd resin, polyurethane resin, polyester resin, polyvinyl butyrate, or combinations of such resins. These resins may be applied from solution of dispersion or from liquids that contain no volatiles. The materials may be nonreactive or may react to a cross-linked relatively insoluble and infusible state.

The thickness of the spacing layer 23 will depend on the ratio of the index of refraction of the microspheres to the index of refraction of the top layer. The layer is sufficiently thick so as to position the specularly reflective layer 24 at the approximate focal plane for light rays passing through the microspheres. If the ratio reaches approximately 1.9 through an appropriate combination of high-index microspheres and low-index top layers, no spacing layer is needed, and a specularly reflective layer may be applied directly to the microspheres.

Instead of forming the specularly reflective layer 24 from metal, dielectric coatings taught in Bingham, U.S. Pat. No. 3,700,305, can be used. Also, specularly reflective pigment may be added to a layer such as the layer 25 in FIG. 2 instead of using a specularly reflective layer such as the layer 24.

Figure 7:
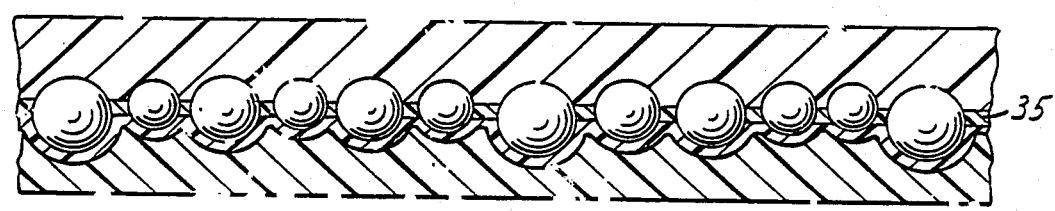
FIG. 7 is an enlarged sectional view through a different variety of sheeting of the invention.

Another structural form for sheeting of the invention is shown in FIG. 7. This sheeting includes an additional layer 35 of binder material, which is useful to perform such additional functions as providing added strength to the construction, or introducing color variations. It should also be noted that although in most cases the microspheres are initially deposited or embedded into a removable carrier web, the carrier web can be left as a permanent part of the sheeting if it has desirable optical properties. For example, a film of polyethyleneterephthalate coated with a thermosoftening polymer may be used.

In most sheeting of the invention the microspheres average less than 100 micrometers in diameter. The narrower the range of diameters, the more uniform and better the properties of the sheeting. Preferably, the range of diameters of the microspheres will extend beyond the average diameter by no more than about plus-or-minus 20 percent, and more preferably by no more than about plus-or-minus 10 percent.

Retroreflective sheeting of the invention reflects most brightly when the top layer is uncolored and clear, in which case the sheeting will generally have a silver or gray appearance caused by the metallic appearance of the vapor-coated aluminum. Colored sheetings can be prepared by placing dyes or transparent pigments in the spacing layer, in the additional layer 35 as shown in FIG. 7, or in the top layer. The invention offers manufacturing economies, since a base material such as shown in FIG. 6 may be prepared, and different top layers later laminated or otherwise applied to the base material.

Sheeting of the invention is generally sold in roll form with the sheeting wound upon itself, and lengths of sheeting are unwound and cut from the roll as needed to cover a sign substrate or other surface. Any release liner covering the adhesive surface of the sheeting is removed when the sheeting is adhered to a substrate.

What we claim is:

1. Retroreflective sheeting comprising: first and second transparent polymeric layers; a monolayer of transparent microspheres embedded in the first layer to, on the average, less than half their diameter, with the second transparent polymeric layer being laminated to the microsphere-covered surface of the first layer, whereby it follows in a substantially constant thickness the curved surfaces of the microspheres protruding from the first layer; and a specularly reflective layer coated on the exposed configured surface of the second layer.

2. Retroreflective sheeting of claim 1 in which the microspheres are free of chemical coatings that limit the ability of organic polymeric binder materials to wet the microspheres.

3. Retroreflective sheeting of claim 1 in which the second polymeric layer is cupped around the back surface of the microspheres sufficiently for the back surface of the layer to have a microroughness of at least 120 micrometers peak-to-peak.

4. Retroreflective sheeting of claim 1 which exhibits a three-quarter-brightness angle of at least 40 degrees.

5. Retroreflective sheeting of claim 1 in which microspheres are present in sufficient amount to cover at least 75 percent of the area of the first polymeric layer.

6. Retroreflective sheeting of claim 1 in which the front surfaces of the microspheres are in substantial alignment.

7. Retroreflective sheeting of claim 1 in which the microspheres are embedded on the average to between 30 and 40 percent of their diameter.

* * * * *